(12) United States Patent
Biester et al.

(10) Patent No.: US 7,231,842 B2
(45) Date of Patent: Jun. 19, 2007

(54) ACTUATING DEVICE

(75) Inventors: Klaus Biester, Wienhausen (DE); Norbert Lenz, Celle (DE)

(73) Assignee: Cameron International Corporation, Houston, TX (US)

( * ) Notice: Subject to any disclaimer, the term of this patent is extended or adjusted under 35 U.S.C. 154(b) by 310 days.

(21) Appl. No.: 10/276,201

(22) PCT Filed: May 7, 2001

(86) PCT No.: PCT/EP01/05158

§ 371 (c)(1),
(2), (4) Date: May 8, 2003

(87) PCT Pub. No.: WO01/86371

PCT Pub. Date: Nov. 15, 2001

(65) Prior Publication Data

US 2003/0167864 A1 Sep. 11, 2003

(30) Foreign Application Priority Data

May 11, 2000 (DE) ................................. 200 08 414

(51) Int. Cl.
*G05G 15/00* (2006.01)
*F16H 25/20* (2006.01)

(52) U.S. Cl. ................... 74/89.25; 74/89.26; 74/89.31; 74/89.45

(58) Field of Classification Search ............... 74/89.23, 74/89.25, 89.26, 89.31, 89.45, 625
See application file for complete search history.

(56) References Cited

U.S. PATENT DOCUMENTS 4,256,065 A * 3/1981 Hirt ........................ 123/90.11
4,295,552 A * 10/1981 Erlach ....................... 192/81 C
4,745,815 A * 5/1988 Klopfenstein ............... 74/89.25
4,920,811 A * 5/1990 Hopper ............................ 74/2
5,195,721 A 3/1993 Akkerman ................... 251/129
5,984,260 A * 11/1999 Rawson et al. ............... 251/71
6,152,167 A * 11/2000 Baker .......................... 137/458
6,158,295 A * 12/2000 Nielsen ..................... 74/89.38

FOREIGN PATENT DOCUMENTS

| EP | 0 384 607 | 8/1990 |
| EP | 1 024 422 | 8/2000 |
| GB | 2 266 942 | 11/1993 |
| WO | WO 98/30816 | 7/1998 |

* cited by examiner

Primary Examiner—William C. Joyce
(74) Attorney, Agent, or Firm—Conley Rose, P.C.

(57) ABSTRACT

An actuation device for adjusting a powered control device opposite the adjusting direction. The actuation device comprises an actuation element axially displaceable in a housing by a feed device at least in the adjusting direction. The actuation device includes an emergency actuation arrangement that may be actuated from outside the housing of the device. The emergency actuation arrangement is connected in motion with the feed device via a direction-switched coupling device. The feed device includes at least one motor for turning a rotating spindle. The at least one motor is rigidly connected with a rotating sleeve mounted capable of rotating in the housing and surrounding the rotating spindle. The rotating sleeve is capable of being set in a direction opposite the feed direction of the rotating spindle relative to the housing.

20 Claims, 3 Drawing Sheets

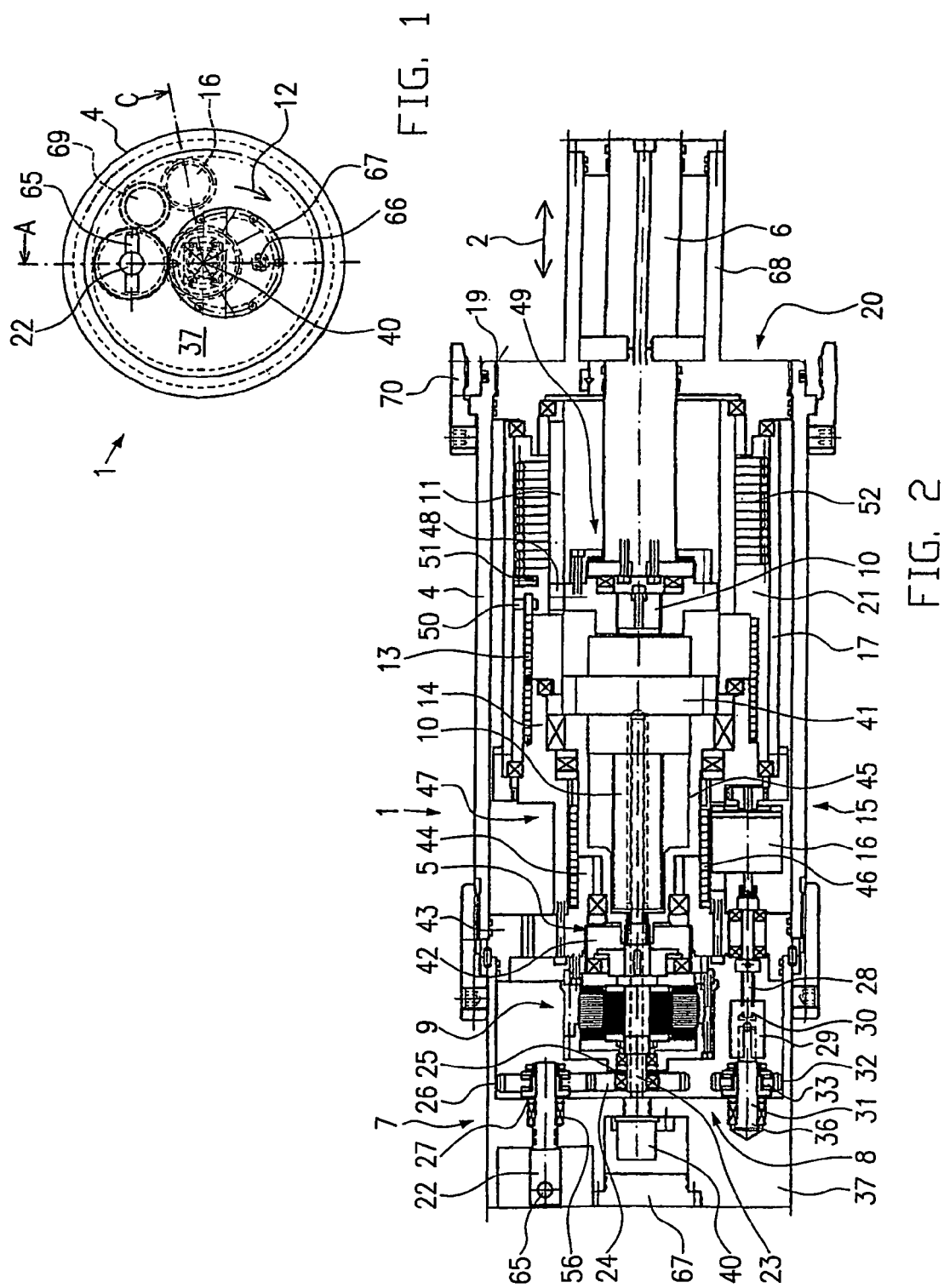

ACTUATING DEVICE

CROSS-REFERENCE TO RELATED APPLICATIONS

This application is a National Phase entry of PCT Application No. PCT/EP01/05158 filed 7 May 2001 which claims priority to German Application No. 200 08 414.3 filed 11 May 2000, both of which are incorporated herein by reference.

STATEMENT REGARDING FEDERALLY SPONSORED RESEARCH OR DEVELOPMENT

Not Applicable.

BACKGROUND

Actuator systems for shifting a control device that is pressure-loaded against the shift direction may incorporate an actuator element housed in a system enclosure that is axially movable at least in the shift direction by an internal advance mechanism.

An actuator system of this type has been known in prior art, serving to actuate control devices such as valves, pressure regulators and the like but most particularly for use in submarine oil and gas exploration and production equipment. The actuator system can be employed equally well in comparable land-based, difficult-to-access or remote equipment.

When the switching device is shifted against the direction of the pressure load, the actuator element is moved axially so that in its extended forward position it serves to shift the control device into the operational ready-state. When the actuator element is homed, i.e., moved back and away from the shift direction, the control device is deactivated. An actuator system of this type is provided with a suitable enclosure protecting it from the elements in a marine or land-based environment. With current actuator systems, however, it is not possible in an emergency to manually operate the system by simple external intervention.

BRIEF DESCRIPTION OF THE DRAWINGS

The following describes advantageous design examples of this invention in more detail with the aid of the figures in the attached drawings in which:

FIG. 1 is a front view of a first design example of an actuator system;

FIG. 2 is a cut-away view along line A–C in FIG. 1;

DETAILED DESCRIPTION OF THE EMBODIMENTS

Figure 3:
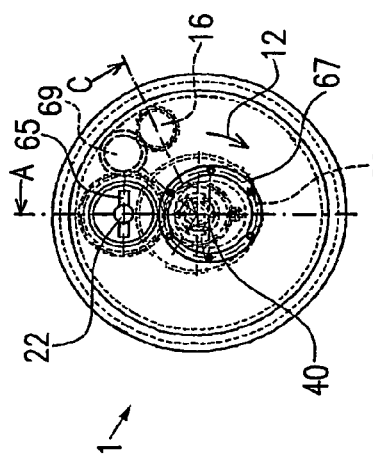
FIG. 3 is a front view of a second design example of an actuator system.

In the drawings and description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

FIG. 1 illustrates a first design example of an actuator system 1. An auxiliary trunnion 22, with diametrically opposite pins for attaching from outside the actuator system 1 an underwater manipulator or similar tool, is accessibly located in a recess. Situated underneath the auxiliary trunnion 22 is a position-monitoring sensor 40 that is operationally connected to a motor shaft 23, per FIG. 2, that is rotatable in the direction of advance rotation 12. Located next to the positional sensor 40, in the same recess in the motor cover 37, again per FIG. 2, is a plug connector 66 for the connection of a cable by way of which data can be transmitted to or retrieved from the actuator system 1. The recess accommodating the positional sensor 40 and the plug 66 can be tightly sealed by means of a cap 67.

A tensioning motor 16 of an emergency release unit 15 is located beside the positional sensor 40 within the system enclosure 4. The system enclosure 4 is sealed off at both ends by a motor cover 37 and, respectively, an enclosure lid 20. Located inside the system enclosure 4 is an electric motor 9 that, by way of a drive unit 42, turns a connecting sleeve 45. The connecting sleeve 45 extends from the drive unit 42 to a cap nut 41 to which it is rigidly connected. A rotating spindle in the form of a ball-type revolving spindle 10 is bearing-mounted inside the cap nut 41. A rotation of the cap nut 41 via the connecting sleeve 45 permits the rotating spindle 10 per FIG. 2 to move in the axial direction. At its end opposite the motor 9, the ball-type spindle 10 is provided with a spindle head 49 that, aided by radially protruding guide lugs 48, can be shifted in longitudinal slots of a rotary sleeve 11. The spindle head 49 is provided with a rotary mount that can be rotated relative to the rotating spindle 10 and is connected to an actuator element 6.

The actuator element 6 is substantially rod-shaped and extends from an outlet end 19 in the enclosure lid 20 of the system enclosure 4. For guiding the actuator element 6 in the direction of a control device 3 per FIG. 5, the enclosure lid 20 is provided with a guide sleeve 68 protruding from the actuator system 1. At both ends of the guide sleeve 68, appropriate seals support the actuator element 6 in watertight fashion.

In the area of the spindle head 49 the rotating spindle 10 is surrounded by the rotating sleeve 11 which in relation to a casing 47 is pivot-mounted by way of appropriate bearings. At its end opposite the rotating sleeve 11, the casing 47 is rigidly but removably attached to an annular disk 43. At its end facing the rotating sleeve 11, the casing 47 is provided with a circular flange 14 around which, and around the associated end of the rotating sleeve 11, a volute spring 13 is wound. In its tensioned state, the volute spring 13 prevents any relative rotation between the casing 47 and the rotating sleeve 11 in the wrong direction.

Attached to the circular flange 14 and the rotating sleeve 11 is a tensioning sleeve 17 one end of which is pivot-mounted in the enclosure lid 20, the other end on the outside of the circular flange 14. At its end facing the circular flange 14, the tensioning sleeve 17 is provided with internal gearing in which engages a gear 58 per FIG. 4. The gear 58 can be rotated by a tensioning motor 16 positioned to the side of the advance mechanism 5 constituted of the motor 9, the connecting sleeve 45, the cap nut 41 and the rotating spindle 10. By way of suitable cams 50, 51 the tensioning sleeve 17 is connected to the volute spring 13 or, respectively, to a return spring 52. By means of the cam 50, a rotation of the tensioning sleeve 17 can bring the volute spring 13 into a tensioning position in rigid connection with the casing 47 and the rotating sleeve 11. At the same time, as the tensioning sleeve 17 is turned, the cam 51 can pre-stress the return spring 52 as the torsion spring to a point where it applies a pressure load on the tensioning sleeve 17 in a direction of rotation opposite the sense of rotation transferred by the tensioning motor 16. The combination of tensioning motor 16, gear 58, tensioning sleeve 17, volute spring 13 and return spring 52 thus constitutes an emergency release unit 15 for the actuator system 1.

An additional volute spring 46 is positioned between a ring extension 44 of the annular disk 43 and an outside area of the connecting sleeve 45. The volute spring 46 transfers a return movement applied by the control device 3 on the actuator element 6 directly to the system enclosure 4.

Opposite the rotating spindle 10 or the gear 58, both the motor 9 and the tensioning motor 16 feature a motor shaft 23 or a tensioning-motor shaft, respectively. The motor shaft 23 is equipped with a gear 24 in the form of a free-wheeling gear with a coaster mechanism 25, thus constituting a directional clutch unit 8. The free-wheeling gear 24 engages in a drive gear 26 which is mounted on one end of the auxiliary trunnion 22, with a slip-ring coupling 27 interpositioned between them. By means of the bearing 56 the auxiliary trunnion 22 is pivot-mounted in the motor-housing cover 37 in which it is also sealed by means of the seals 56, thus protecting an inner space 21 of the system enclosure 4 from the marine or on-land environment surrounding the actuator system 1.

The motor shaft 23 extends all the way to the positional sensor 40 which can thus gauge the rotations of the motor shaft 23.

The free end 30 of the tensioning-motor shaft 28 is located inside a sleeve nut 29. On its side opposite the tensioning-motor shaft 28, the sleeve nut 29 is provided with at least one longitudinal slot 53 that guides a pin radially protruding from a threaded spindle 31. At its spindle end 36 opposite the sleeve nut 29, the threaded spindle 31 is pivot-mounted in the motor cover 37. The threaded spindle 31 is equipped with a tensioning gear 32. A slip-ring coupling 33 is provided between the threaded spindle 31 and the tensioning gear 32. By way of an intermediate gear 69 per FIG. 1 or 3, the tensioning gear 32 is operationally connected to the drive gear 26.

Figure 4:
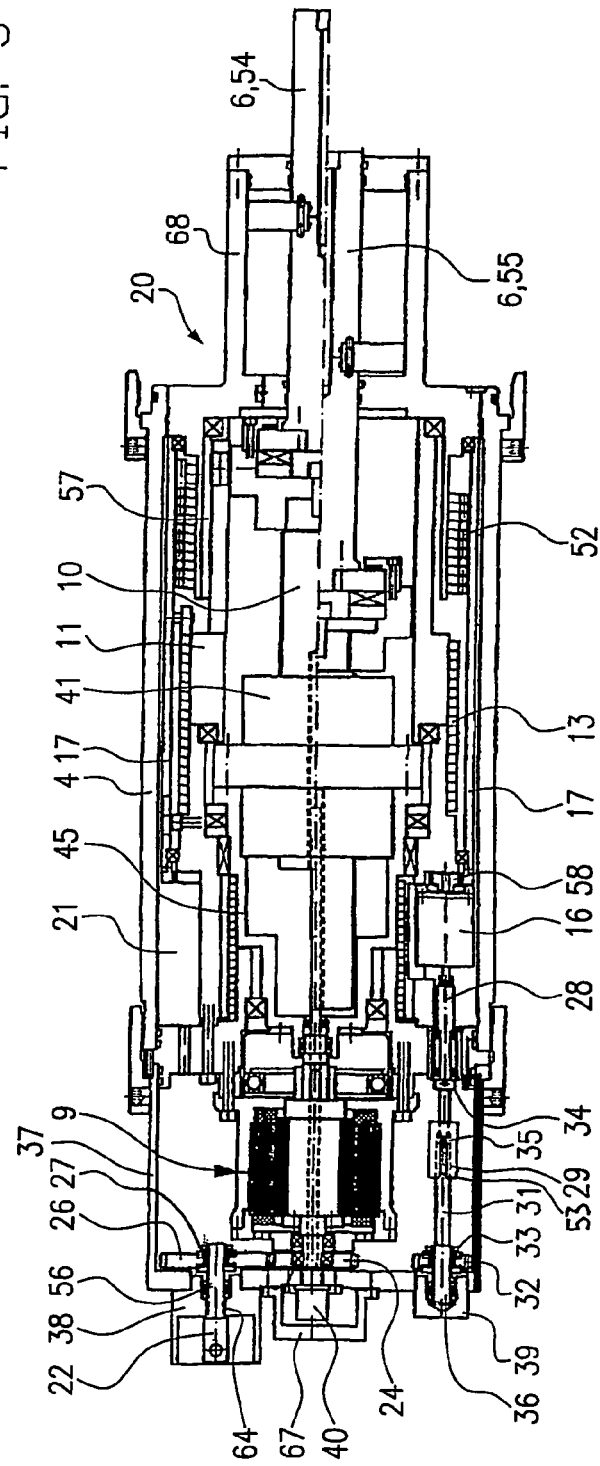
FIG. 4 is a cut-away view along line A–C in FIG. 3.

The sleeve nut 29 is adjustable between the stops 34 and 35, per FIG. 4, depending on the direction of rotation of the threaded spindle 31 or of the tensioning-motor shaft 28. The stop 34 is located on the tensioning-motor shaft 28, the stop 35 is constituted of the end of the slot 53. The distance between the stops 34 and 35 is shorter than the slot 53.

The combination of auxiliary trunnion 22, drive gear 26, free-wheeling gear 24, tensioning gear 32, threaded spindle 31, sleeve nut 29 and tensioning motor shaft 28 forms the emergency actuator assembly 7 by means of which, in the event power to the motor 9 or to the tensioning motor 16 is interrupted or some other problem interferes with the normal operation of the actuator system 1, the actuator element 6 can be shifted into its operating position 2.

FIG. 3 illustrates another design example of an actuator system 1. In this figure as in the figures that follow, identical parts bear identical reference numbers, while the continued description of these components is based on FIGS. 1 and 2. In FIG. 4, the upper half shows the actuator element in the extended position 54, the lower half shows it in its retracted position 55. In the extended position 54, the return spring 52 is cocked and applies return pressure on the tensioning sleeve 17. In the second design example the enclosure lid 20 is provided with a plug-in sleeve 57 protruding into the inner space 21 of the system enclosure 4 and surrounded by the return spring. 52.

Mounted in the motor cover 37 opposite the enclosure lid 20 are bearing boxes 38, 39 in which the auxiliary trunnion 22 and, respectively, the spindle end 36 of the threaded spindle 31 are pivot-mounted. The bearing boxes 38, 39 protrude outward in the longitudinal direction and past the motor cover 37. The bearing box 38 also contains a suitable seal 64 for the auxiliary trunnion 22.

Figure 5:
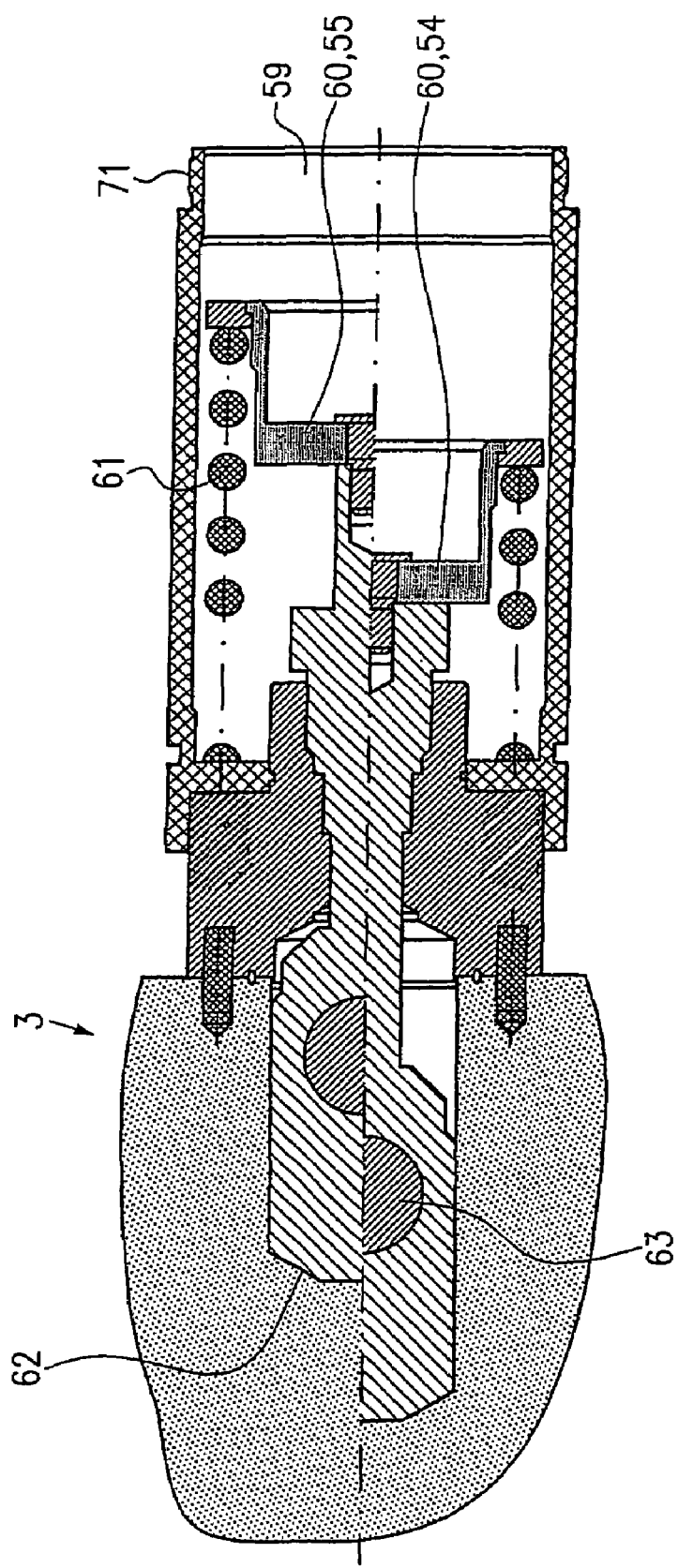
FIG. 5 is a conceptual sectional view of a control device designed to connect to an actuator system.

FIG. 5 is a sectional cutaway view of a control device 3 that can be actuated by the actuator systems 1 per FIGS. 2 and 4. In FIG. 5 the control device is provided on the right-hand side with a connecting end 59 into which the guide sleeve 68 of the enclosure lid 20 can be inserted. Suitable fastening provisions 70, per FIGS. 2 and 4, serve to removably attach the actuator system 1 to the outer perimeter 71 of the connecting end 59.

In the design example illustrated the control device 3 is equipped with a slide 62 that has a substantially circular slide opening 63. In the upper half of FIG. 5 the slide 62 is depicted in a position corresponding to the retracted state 55 of the actuator element 6, in the lower half of FIG. 5 it is shown in the extended position 54 of the actuator element 6. In the extended position 54 of the actuator element 6 the slide 62 is open, in its retracted position 55 the slide 62 is closed.

At its end opposite the slide opening 63, the slide 62 is provided with a takeup receptacle 60 to whose bottom the actuator element 6 is connected and removably attached. In FIG. 5, the takeup receptacle 60 is shown in the positions of the actuator element 6 corresponding to the extended position 54 and, respectively, retracted position 55 of the actuator element 6. A return spring 61 is positioned around the takeup receptacle 60, applying pressure on the takeup receptacle 60 in the direction of the retracted position 55 of the actuator element 6.

In operation, running the motor 9 will move the actuator element 6 into its shift position 2, in the process of which the rotary movement of the motor 9 is transferred via the connecting sleeve 45 and the cap nut 41 to the rotating spindle 10 and is converted into a translatory axial movement. The movement of the rotating spindle 10 causes a shift of the actuator element 6 along the guide slots in the rotating sleeve 11 up to its fully extended position 54. In the course of or prior to this operation of the actuator system 1, the rotation of the tensioning sleeve 17 by the tensioning motor 16 causes the cams 50, 51 to cock or tension the volute spring 13 and the return spring 52. The tensioning of the volute spring 13 and return spring 52 holds the rotating sleeve 11 in a rigid position relative to the system enclosure 4.

When the motor 9 turns, the directional clutch 8 prevents the auxiliary trunnion 22 from turning along with the motor 9, reducing the operating load of the motor considerably and at the same time avoids any exposure of the seals 64 at the auxiliary trunnion to friction or even wear. In other words, the free-wheeling gear 24 works in a way that it does not turn during the normal opening process of the slide 62. The holding function of the tensioning motor may then be deactivated, thus allowing the retractive force of the return spring 52 to turn back the tensioning sleeve 17, releasing the volute spring 13. The slide 62 may then be closed, and the actuator element 6 shifted into its retracted position 55, by the resetting action of the return spring 61 of the control device 3. This may be followed by the retraction of the actuator element 6 into the system enclosure 4 under the action of the return spring 61, in the process of which the rotating spindle 10, together with the rotating sleeve 11, can be turned back for instance all the way to its position in the cap nut 41 indicated in FIG. 2. There is no concomitant rotation of the motor 9 since the actuator element 6 is reset by a revolving rotary spindle 10 while the cap nut 41 remains stationary. Thus, the emergency actuator assembly 7 and its components may remain in an idle standby state during normal operation, without requiring any further technical provisions, i.e., they are not moved in any way.

If in an emergency situation the slide 62 is to be opened by the emergency actuator assembly 7, the auxiliary trunnion 22 is turned in the appropriate direction, in this case also turning the motor 9 by way of the free-wheeling gear 24 and coaster mechanism 25, as a result of which the actuator element 6 is shifted into its extended position 54 described above. During this process the slip-ring coupling 27 on the drive gear 26 protects the motor 9 against excessive torque.

At the same time, by way of the intermediate gear 69 and the tensioning gear 32, the tensioning motor 16 is set in motion to activate the emergency release unit 15. The emergency release unit 15 is so designed that after only a few hundred revolutions of the tensioning-motor shaft 28 the volute spring 13 and return spring 52 are tensioned and by virtue of the slip-ring coupling 33 any further torque action on the tensioning motor 16 is prevented.

Thus, the emergency actuator assembly 7 ensures full safety and at the same time the emergency release unit 15 is activated. Since the motor 9 and, accordingly, the rotating spindle 10 or cap nut 41 require several thousand revolutions to fully open the slide 62, the emergency release unit 15 is fully operational even before the slide 62 is open.

The sleeve nut 29 further ensures that during normal operation the tensioning motor 16 cannot and must not turn the emergency actuator assembly 7. This is possible due to the fact that the tensioning motor 16 makes only a small turn and there is ample play in the sleeve nut 29 between the stops, as illustrated in FIG. 4.

If in an emergency situation the actuator system 1 must be used to close the slide 62, the auxiliary trunnion 22 is turned in the opposite direction. Only a few turns are necessary to trigger the emergency release unit 15. That unit then works as described above, without the motor 9 turning along with it since in this case again the free-wheeling mechanism is activated.

In submarine applications, the emergency actuator assembly allows operation of the actuator element for shifting the control device by underwater manipulators or small minisubs. It is thus possible even in the event of a power failure or other control-device problem for instance to open a valve and thus, with the appropriate equipment, to restore access to a borehole or the like. By appropriate switching of the control device in an emergency situation the borehole or extraction site can therefore be secured so as to permit external repair work without endangering the environment.

During operation, the advance mechanism can function without engaging the emergency actuator assembly or exposing it to wear, by the interpositioning of the directional clutch unit between the emergency actuator assembly and the advance mechanism. In specific terms, whenever the advance mechanism moves the axially movable actuator element into the shift position, the mechanical movement is not transferred to the emergency actuator assembly.

Because the actuator element is to be reset by the control device that is pressure-loaded against the shift direction, and in order to keep the design of the actuator system simple, the advance mechanism can be equipped with at least one motor serving to drive a rotary shaft that is solidly connected to a rotating sleeve pivot-mounted inside the system enclosure and surrounding the rotary shaft, in which case the rotating sleeve can be designed to lock in the direction opposite the direction of advance rotation of the rotary shaft in the system enclosure.

To allow the emergency actuator assembly to move the actuator element at least in the shift direction, the clutch unit can be set in the advance direction of rotation, meaning that when the rotary shaft rotates in the advance direction of rotation, the clutch unit disengages both the advance mechanism and the emergency actuator assembly, whereas in the event for instance of a motor failure it is possible for the emergency actuator assembly, by causing the clutch to engage, to turn the rotary shaft in the forward, i.e., advance direction of rotation.

As a simple way to cushion the advance mechanism against the pressure load applied by the control device in the direction opposite the shift direction, the rotating sleeve can be provided with a volute buffer spring attached to a stationary circular flange mounted in the system enclosure, permitting the rotating sleeve to be rotationally locked in the direction opposite the rotary advance direction. This ensures the ability of the rotary shaft to turn in the advance direction without being inhibited by the volute buffer spring when extending the actuator element. At the same time any automatic extension of the actuator element into the system enclosure under the pressure applied by the control device against the shift direction will be prevented by the volute spring. The physical stress applied by the pressure load is absorbed by the system enclosure.

In order to permit automatic resetting of the actuator element for closing the control device even during a power failure or other problem, the volute spring is equipped with an emergency release unit for resetting the actuator element against the shift direction. As an example, such an emergency release unit would be a tensioning sleeve for the volute spring, pressure-loaded in the relaxation direction, rotatable between a cocked and a release position by means of a tensioning motor and especially a step motor, and releasably held in that cocked position.

The emergency release unit can be accommodated in the system enclosure by mounting the tensioning motor inside the enclosure next to the advance mechanism. The tensioning sleeve and the associated volute spring extend in essentially concentric fashion around the rotary shaft within the system enclosure.

For as long as electric power is fed to the tensioning motor, it applies a holding force to the tensioning sleeve, counteracted by the pressure load on the tensioning sleeve in the direction of the relaxed position. If the electric power fails or drops, the pressure load will cause the tensioning motor and in particular the tensioning sleeve to turn in the direction of the relaxed position. In a simple design example, the pressure load bearing on the tensioning sleeve in the direction of the relaxed position can be provided by a return spring mounted between the tensioning sleeve and the system enclosure or on any suitable component immovably attached in relation to the system enclosure. It should be noted that this return spring may be employed both for emergency closing and for normal closing operations, i.e., for resetting the tensioning sleeve when the volute spring is to be released.

In the simplest case, the immovable component referred to may be a detachable lid mounted at the outlet end of the system enclosure.

To permit uncomplicated operation of the emergency actuator assembly by underwater manipulators, small minisubs or the like, the actuator system can be provided with a rotatable auxiliary trunnion that protrudes from the interior of the system enclosure and that is movably linked to the directional clutch inside the interior. The end of the auxiliary trunnion protruding from the system enclosure may be suitably contoured to fit into a matching manipulating tool.

Simple coupling of the clutch unit to the advance mechanism can be obtained by mounting the directional clutch unit on a motor shaft protruding from the motor opposite the rotary shaft.

A simple design example of a directional clutch unit would be a free-wheeling gear with coaster mechanism where the gear engages in a drive gear on the auxiliary trunnion.

To protect the motor against inadvertent actuation, a slip-ring coupling can be interpositioned between the auxiliary trunnion and the drive gear, preventing the transfer of an excessive torque to the motor.

To also permit operation of the emergency release unit via the auxiliary trunnion, i.e. the emergency actuator assembly, a tensioning-motor shaft may be designed to protrude from the tensioning motor opposite the tensioning sleeve and to be movably linked to the auxiliary trunnion.

In a simple design example the tensioning-motor shaft may be linked to the drive gear or to the free-wheeling gear.

To prevent the tensioning motor from driving, or having to drive, the emergency actuator assembly in reverse during normal operation, overrun protection is provided for instance by means of a sleeve nut connecting a free end of the tensioning-motor shaft to a threaded spindle equipped with a tensioning gear that engages in the drive gear or the free-wheeling gear.

In this case as well, the tensioning gear may be provided with a slip-ring coupling to prevent an inadvertent actuation of the tensioning motor.

The play or clearance of motion of the sleeve nut may be such that it permits essentially nonrotational axial movement between two stops respectively on the tensioning-motor shaft and the threaded spindle.

For secure suspension, the threaded spindle may be pivot-mounted at its end opposite the tensioning-motor shaft.

In this configuration it may be considered desirable to pivot-mount the end of the spindle and/or the auxiliary trunnion in a motor cover plate that can be removably attached to the system enclosure.

The pivot bearing may be mounted directly in the motor cover or in a spindle-end and/or auxiliary-trunnion bearing box removably attached to the motor cover.

To permit possible checking of the motor or rotating spindle, and thus of the actuator element for any torsional misalignment, at least one detector may be installed to monitor the position of the threaded spindle and/or the tensioning-motor shaft and/or the motor shaft.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. An actuation device for adjusting a powered control device in the shift direction, the actuation device comprising:
   an actuator element axially displaceable in a housing by a feed device at least in the shift direction;
   an emergency actuation arrangement actuatable from outside the housing of the device and connectable in motion with the feed device via a direction-switched coupling device to displace the actuator element in the shift direction;
   the feed device comprising at least one motor capable of rotating a rotating spindle in an advance rotation direction to axially displace the rotating spindle in at least the shift direction, the rotating spindle connected against relative rotation with a rotating sleeve; and
   the rotating sleeve being lockable against rotation in a return rotation direction such that the rotating spindle is prevented from moving axially in a direction opposite the shift direction.

2. The actuation device as in claim 1, wherein the direction-switched coupling device further comprises a clutch unit that operates unidirectional in the advance rotation direction.

3. The actuation device as in claim 1, wherein the rotating sleeve is lockable against rotation in the return rotation direction by a volute spring engageable to connect the rotating sleeve with a circular flange connected to the housing.

4. The actuation device as in claim 3, wherein the volute spring connects to an emergency release unit capable of resetting the actuator element in a direction opposite the shift direction, the emergency release unit comprising a tensioning sleeve for engaging the volute spring, the tensioning sleeve torqueable in the return rotation direction by the powered control device, rotatable between a tensioned and a relaxed position by means of a tensioning motor, and releasably retainable in the tensioned position by the tensioning motor.

5. The actuation device as in claim 4, wherein the tensioning motor is mounted within the housing.

6. The actuation device as in claim 4, wherein the emergency release unit further comprises a return spring tensionable to apply torque on the tensioning sleeve and move the tensioning sleeve to the relaxed position upon release by the tensioning motor, the return spring mountable between the tensioning sleeve and the system enclosure or on a component rigidly attached to the housing.

7. The actuation device as in claim 6, wherein the rigid component is an enclosure lid attachable to an exit end of the housing.

8. The actuation device as in claim 1, wherein the emergency actuation arrangement comprises a rotatably mounted auxiliary trunnion that protrudes from an interior space in the housing and is operationally linked to a directional clutch unit in the interior space.

9. The actuation device as in claim 8, wherein the directional clutch unit is mounted on a motor shaft extending from the motor opposite the rotating spindle.

10. The actuation device as in claim 8, wherein the directional clutch unit is a free-wheeling gear with an associated coaster mechanism, which gear engages in a drive gear positioned on the auxiliary trunnion.

11. The actuation device as in claim 8, wherein a slip-ring coupling is provided between the auxiliary trunnion and a drive gear.

12. The actuation device as in claim 8, further comprising:
   the rotating sleeve being lockable against rotation in the return rotation direction by a volute spring engageable to connect the rotating sleeve with a circular flange connected to the housing; and
   an emergency release unit capable of resetting the actuator element in a direction opposite the shift direction, the emergency release unit comprising a tensioning sleeve engaged with the volute spring, the tensioning sleeve torqueable in the return rotation direction by the powered control device, rotatable between a tensioned and a relaxed position by means of a tensioning motor, and releasably retainable in the tensioned position by the tensioning motor; and
   a tensioning-motor shaft that protrudes from the tensioning motor opposite the tensioning sleeve and is operationally linked to the auxiliary trunnion.

13. The actuation device as in claim 12, wherein the directional clutch unit is a free-wheeling gear with an associated coaster mechanism, which gear engages in a drive gear positioned on the auxiliary trunnion and wherein the tensioning-motor shaft is operationally connected to the drive gear or to the free-wheeling gear.

14. The actuation device as in claim 12, further comprising:
   wherein the directional clutch unit is a free-wheeling gear with an associated coaster mechanism, the gear engaging a drive gear positioned on the auxiliary trunnion;
   a sleeve nut connecting a free end of the tensioning-motor shaft to a threaded spindle; and
   a tensioning gear engaging the threaded spindle and operationally connecting the tensioning-motor shaft and the drive gear or free-wheeling gear.

15. The actuation device as in claim 14, wherein a slip-ring coupling is associated with the tensioning gear.

16. The actuation device as in claim 14 wherein the sleeve nut is movable in substantially non-rotational fashion between two stops along the tensioning-motor shaft and, respectively, the threaded spindle.

17. The actuation device as in claim 14, wherein the threaded spindle is rotatably mounted at its spindle end opposite the tensioning-motor shaft.

18. The actuation device as in claim 17, wherein the spindle end and/or the auxiliary trunnion are rotatably mounted in a motor cover removably attachable to the housing.

19. The actuation device as in claim 18, wherein the spindle end and/or the auxiliary trunnion are rotatably mounted in the motor cover using at least one removably attached bearing box.

20. The actuation device as in claim 12, wherein at least one positional sensor is associated with the threaded spindle and/or the tensioning-motor shaft and/or the motor shaft.

* * * * *